United States Patent [19]

Siegel

[11] 4,180,982
[45] Jan. 1, 1980

[54] INSTANT RETURN-STROKE DIFFERENTIAL TEMPERATURE ENGINE

[76] Inventor: Israel Siegel, 351 W. 71 St., New York, N.Y. 10023

[21] Appl. No.: 779,709

[22] Filed: Mar. 21, 1977

[51] Int. Cl.$^2$ .............................................. F03G 7/06
[52] U.S. Cl. ........................................ 60/531; 60/641
[58] Field of Search ................. 60/495, 497, 516, 522, 60/531, 641, 651, 669, 671

[56] References Cited

U.S. PATENT DOCUMENTS

| | | | |
|---|---|---|---|
| 2,105,196 | 1/1938 | McCauley | 92/100 |
| 2,578,992 | 12/1951 | Dickey | 60/531 |
| 3,132,472 | 5/1964 | Schweitzer | 60/531 |
| 3,728,858 | 4/1973 | Sorensen | 60/671 X |
| 3,834,165 | 9/1974 | Arff | 60/531 |
| 3,846,984 | 11/1974 | Siegel | 60/531 X |

*Primary Examiner*—Allen M. Ostrager
*Assistant Examiner*—Stephen F. Husar

[57] ABSTRACT

The invention consists of a differential temperature engine in which the return stroke is achieved independently of the contraction of the vapor which induced the initial movement of the moving member. The engine consists of a relatively cold and a relatively warm chamber which are sealed from the outside environment, and contain a low boiling point fluid. One end of a cylinder communicates with the vapors in the relatively warm chamber while the opposing end of the cylinder communicates with the vapors in the relatively cold chamber. When there is no communication between the cold and warm chambers a vapor pressure differential upon the opposing ends of a piston within the cylinder causes the piston to move towards the cold chamber. The return stroke of the piston is induced by equalization of the pressures upon the two opposing ends of the piston. This is obtained either by the establishment of a communication between the cold and the warm chamber, or by establishment of a communication of the two opposite ends of the cylinder with the warm chamber.

4 Claims, 3 Drawing Figures

INSTANT RETURN-STROKE DIFFERENTIAL TEMPERATURE ENGINE

BACKGROUND OF THE INVENTION

The invention relates to engines which are adapted to operate at low temperatures, and in particular to improvements in differential temperature engines previously invented by the author (U.S. Pat. No. 3,846,984).

A differential temperature engine consists of a relatively cold and a relatively warm chamber, sealed from the outside air and containing an evaporating liquid. A moving member responds to changes in vapor pressures in the chambers, induced by intermittant communication between the chambers. In the original version of the engine the return stroke of the moving member is dependent upon the loss of heat and contraction of the vapors in the cold chamber. The speed of the return stroke is therefore dependent upon heat transfer of the relatively warm vapors to the heat sink. Under certain conditions this may significantly reduce the speed of the return stroke. In the engine described in the present invention the return stroke is induced by the equalization of the vapor pressure upon the two opposing sides of the moving member. This results in an instant return stroke which is independent of the cooling of the vapor.

Two different methods have been utilized to equalize the vapor pressure up the opposing sides of the moving member. In one form of the invention the equalization is obtained by the establishment of a communication between the cold and the warm chamber. In another form of the invention the equalization is obtained by simultaneous communication of both opposing ends of the moving member with the vapors in the relatively warm chamber. The latter version results in a significant saving of thermal energy, since the cooling of the vapor of the warm chamber during the return stroke is avoided. The objectives of the present invention are thus as follows, 1. To obtain an instant return stroke by simultaneous exposure of the opposing sides of a moving member to the same vapor pressure;
2. To save thermal energy during the return stroke of the piston by exposure of a moving member to the warm chamber instead of to the cold chamber. Other objectives of the present invention will become evident during the ensuing detailed description.

SUMMARY OF THE INVENTION

The invention describes a modified version of a differential temperature engine. The engine consists of a relatively cold and a relatively warm chamber sealed from the outside atmosphere, and containing a low boiling point liquid. The warm chamber serves as an evaporator while the relatively cold chamber serves as a condensor. The temperature differential between the evaporator and the condensor chambers causes a corresponding vapor pressure differential between the chambers. One end of a cylinder communicates with the vapor phase of the warm chamber while the opposite end of the cylinder communicates with the vapor phase of the cold chamber. The cylinder contains a piston which moves freely within the cylinder, but does not allow the movement of vapor through the cylinder. The two opposing ends of the piston are therefore exposed to a vapor pressure differential. This causes the piston to be moved by relatively high pressure vapors of the warm chamber. The piston returns to its original position through an equalization of the pressure upon the two ends of the piston. This is accomplished by the exclusive communication of the two ends of the cylinder with the warm chamber.

In another form of the invention an intermittent equalization of the pressures upon the two opposing ends of the piston is accomplished by an intermittent communication between the vapors of the cold and the warm chambers. This is achieved by the movement of the piston which periodically exposes and obstructs an opening in the cylinder wall.

The liquid which condenses in the cold chamber is returned to the chamber by force of gravity during the equalization of the pressures upon the two ends of the cylinder.

DETAILED DESCRIPTION

Figure 1:
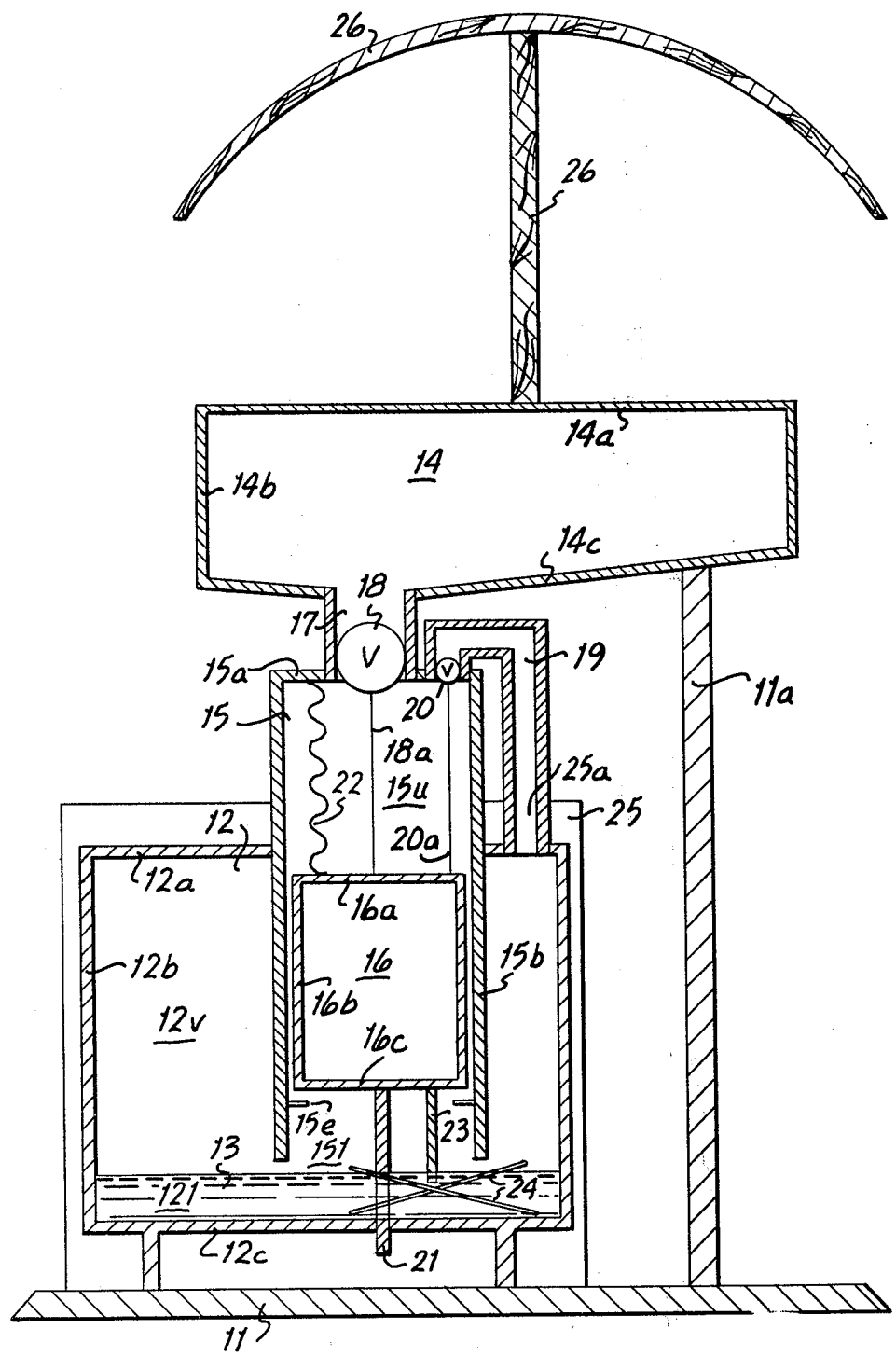
FIG. 1 is a diagrammatical sectional view of a differential temperature engine in which the return stroke is accomplished by the exclusive communication of the two opposing sides of the moving member with the warm chamber.

Referring to the drawings there is shown in FIG. 1 an engine embodying the present invention. As shown, a support 11 is provided for supporting a chamber 12, which functions as an evaporator, as will be hereinafter described. In the illustrated form of the invention the evaporator chamber is defined as a rectangular chamber having top wall 12a, side walls 12b, and bottom wall 12c. Chamber 12 contains a liquid, preferably a low boiling point liquid 13, wherein the liquid defines a liquid chamber portion 12l and a vapor portion 12v.

Suitably supported on a frame extension 11a is another chamber 14 which functions as a condensor, as will be hereinafter described. As illustrated, the condensor chamber 14 is defined by an upper wall 14a, side wall 14b, and bottom wall 14c. Bottom wall 14c is oblique to allow the draining of fluid from condensor 14 as will be hereinafter described.

A cylinder 15 is present between evaporator chamber 12 and condensor member 14. The cylinder is defined by upper wall 15a and side wall 15b. The arrangement is that the lower portion of cylinder 15 is present inside evaporator chamber 12 and the lower opening of cylinder 15 communicates with the vapor portion 12v of evaporator chamber 12. The cylinder 15 penetrates chamber 12 through upper wall 12a of chamber 12. The cylinder 15 forms a tight fit with the upper wall 12a to prevent any leakage of vapor from evaporator 12 to the outside. A piston 16 is present inside cylinder 15 and rests upon cylinder wall extensions 15e. The piston is defined by upper wall 16a, side walls 16b, and bottom wall 16c. The side walls 16b of piston 16 are in close proximity to the inside side walls 15b of cylinder 15. This prevents the passage of vapor through the cylinder, but allows the piston to move up and down within the cylinder. The piston defines a top cylinder portion 15u, present above the piston's top wall 16a, and a low cylinder portion 15l present below bottom wall 16c of the piston. The dimensions of top cylinder portion 15u are such that when piston 16 is in its upper position the volume of top cylinder portion 15u above the piston is extremely small. Conduit 17 communicates between the portion 15u and condensor 14. Valve 18 is present in the lowest portion of conduit 17 and controls the opening and closing of the conduit 17. Valve actuator 18a connects valve 18 with the upper wall 16a of piston 16. Conduit 19 communicates between the uppermost portion of top cylinder portion 15u and the vapor chamber portion 12v of evaporator chamber 12. Valve actuator 20a connects valve 20 with upper wall 16a of piston 16. The arrangement is such that when piston 16 is in its lower position in cylinder 15, valve 18 is open and valve 20 is closed. When piston 16 is in its uppermost position, valve 18 is closed and valve 20 is open.

Connected to the bottom wall of piston 16 is a force transmitting rod 21. Rod 21 passes through lower wall 12c of chamber 12 and is connected through conventional linkages (not shown) with a work producing means such as a crank or a moving portion of a generator. The rod 21 fits closely with penetrated wall 12c to prevent leakage of fluid 13 from chamber 12. Compression spring 22 is present between upper wall 16a of piston 16 and upper wall 15a of cylinder 15. The arrangement is such that spring 22 exerts a slight downward force upon piston 16 to overcome friction between piston 16 and cylinder 15 and to keep the piston 16 naturally in its low resting position. Rod 23 extends from lower wall 16c of piston 16 into liquid 13. Blades 24 are attached to the lower end of rod 23. The arrangement is such that the movement of piston 16 causes a corresponding movement of rod 23 and blades 24 to agitate the fluid 13 to affect an even distribution of heat in the liquid 13.

Suitably supported on base 11 is a transparent enclosure 25, e.g. a glass or plastic enclosure. The walls of the enclosure 25 are adapted to allow sunlight to enter freely into the enclosure but to hinder heat from leaving the enclosure. The upper wall of enclosure 25 has a small opening 25a to allow tube 19 to pass through and communicate with evaporator chamber 12. The diameter of tube 19 and opening 25a are such that the tube fits closely into 25a to minimize the loss of heat from enclosure 25 to the outside atmosphere. The surfaces of all members situated within the enclosure 25 may be painted black to augment the absorption of heat from solar radiation entering the enclosure.

Suitably supported on condensor chamber 14 is a solar shield 26 made out of non-transparent material, e.g. wood. In the illustrated form of the invention the solar shield 26 is in the form of a dome which is adapted to shield condensor chamber 14 from direct rays of the sun.

The operation of the engine as illustrated in FIG. 1 is as follows. Before the engine starts the piston 16 is at its lowest position, and rests upon cylinderwall extensions 15e. Valve 18 is open and valve 20 is closed. On a sunny or hazy day, solar thermal energy accumulates in transparent enclosure 25. This results in the increase of temperature of air inside enclosure 25, and of evaporator chamber 12, to above ambient temperature. In contrast, solar rays are mostly prevented from reaching condensor chamber 14. This results in a temperature differential between chambers 12 and 14, and a corresponding vapor pressure differential between the chambers, i.e. the vapor pressure in the evaporator chamber 12 becomes larger than the vapor pressure in condensor chamber 14. When valve 18 is open the vapor in upper portion 15u of cylinder 15 communicates with the vapor in the condensor chamber 14. The vapor pressure upon top wall 16a of piston 16 will therefore be equal to the relatively low vapor pressure of the condensor chamber 14. In contrast, the lower portion 15l of cylinder 15 communicates with the vapor in the evaporator chamber 12. This will cause the vapor pressure upon bottom piston wall 16c to be equal to the relatively high vapor pressure in the evaporator chamber 12. When the pressure differential between the top and bottom walls of piston 16 exceeds the weight of the piston 16 and the resistance of spring 22, the piston 16 will move upwards in cylinder 15. As piston 16 moves upward and reaches its upper limit of travel, valve actuator 18a will close valve 18, and valve actuator 20a will open valve 20. The closing of valve 18 will prevent the communication between upper portion 15u of cylinder 15 and condensor chamber 14, while the opening of valve 19 will establish a communication between the upper portion 15u of cylinder 15 and the vapor portion 12v of evaporator chamber 12. This will cause the pressure upon the top wall 16a of piston 16 to be equal to the pressure in evaporator chamber 12. This will equalize the pressures exerted upon top and bottom walls of piston 16. The vapor pressure differential which has forced piston 16 upward against the force of gravity and the force of the compression spring 22 will thus be eliminated and spring 22 will force piston 16 to move to its initial lower starting position. As piston 16 descends and reaches its lowest limit of travel, valve actuator 20a closes valve 20 and valve actuator 18a opens valve 18. Vapor which has accumulated in space 15u during the communication of space 15u with the vapor portion 12v of evaporator chamber 12 will expand into condensor chamber 14. The relatively low temperature in condensor chamber 14 will cause the entering vapor to condense into a liquid. The liquid will accumulate upon the bottom wall 14c of chamber 14 by force of gravity, and will be directed by the oblique direction of wall 14c into upper space 15u of cylinder 15. The liquid will return to evaporator chamber 12 through conduit 19 when valve 20 opens during the normal operation of the engine.

The heat which has been transferred into condensor chamber through the relatively warm vapor from portion 15u will be dissipated into the environment through the walls of container 14. New heat will be transferred to evaporator chamber 12 and liquid 13 from solar thermal energy which has accumulated in enclosure 25. The temperature differential between evaporator chamber 12 and condensor 14 will cause the rise of piston 16 and the renewal of the cycle of operation. In a complete cycle of operation the up and down movement of the piston 16 will affect corresponding movement of the force of transmission member 21. This movement is readily translated, through appropriate linkages, to useful work. The movement of the piston 16 will cause a corresponding movement of rod 23 and blades 24 to agitate fluid 13 and to cause an even distribution of heat in the liquid.

It is understood that a temperature differential between the evaporator chamber and condensor chamber may be obtained by other means without departing from the essential features of the invention. This may include cooling of the condensor chamber by selective wetting of the surfaces of condensor chamber 14 to cool chamber 14 by natural evaporation of water. Under conditions in which the temperature of a body of water is cooler than that of the atmosphere the condensor chamber may be cooled by immersion in the relatively cold water. When the condensor chamber is placed at a lower level than the evaporator chamber the liquid condensate accumulating in the condensor chamber may be returned to the evaporator chamber through the action of a simple pump. Under conditions in which the temperature of a body of water is warmer than that of the atmosphere transparent enclosure 25 may be omitted, and the evaporator chamber 12 immersed in the relatively warm body of water.

While the illustrated mechanism to return piston 16 to its initial position (during the communication of both ends of the cylinder with the warm chamber) consisted of a spring or gravity other means such as a crank mechanism may be utilized to return the piston to its initial position through circular inertia.

Figure 2:
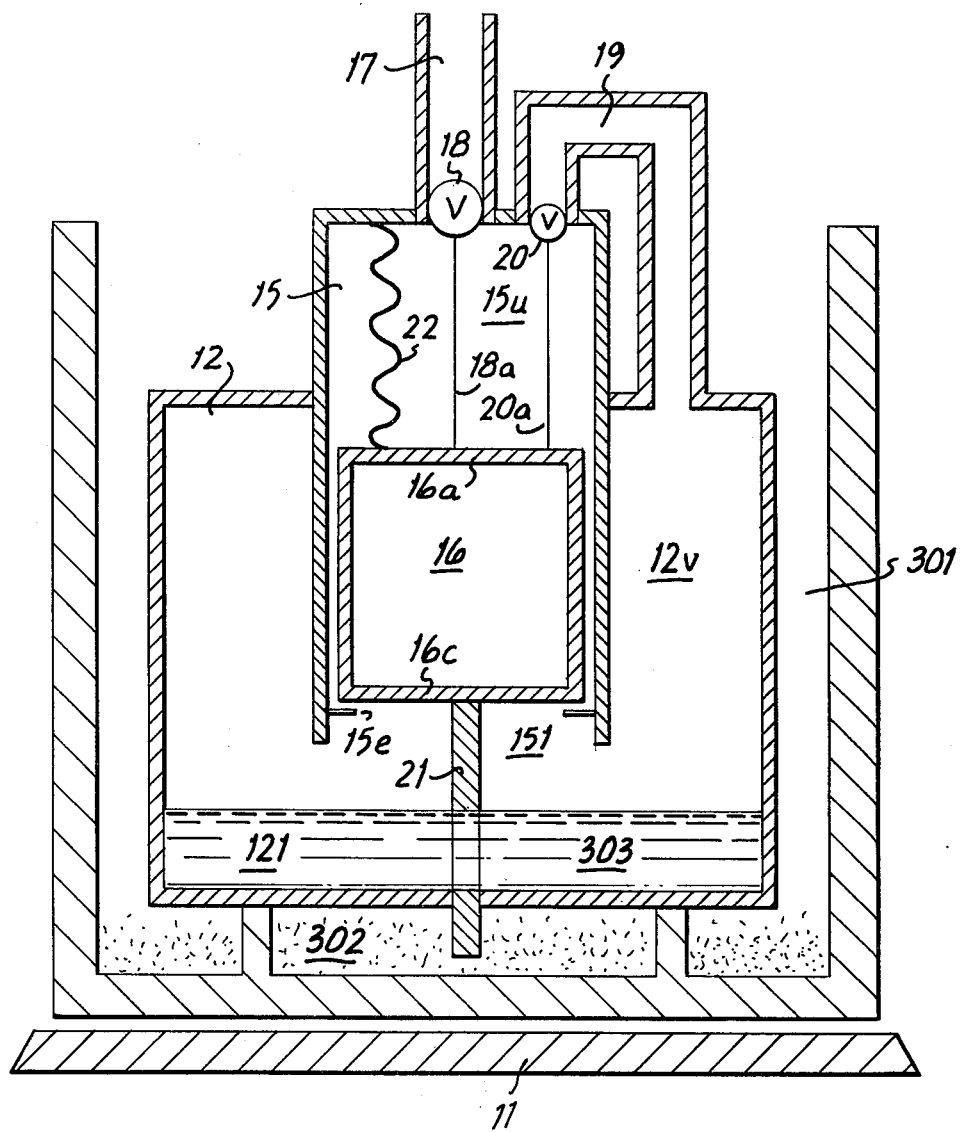
FIG. 2 is a diagrammatical sectional view of a similar engine adapted to function as a steam engine, operated by conventional fuel.

FIG. 2 represents another form of the engine in which the engine is adapted to function as a steam engine. It is basically similar to the invention described in FIG. 1 and similar parts have been given similar numbers. The engine described in FIG. 2 is different from the engine described in FIG. 1 by the following. The condensor chamber 14 and its associated structures 11a and solar shield 26 have been omitted. Upper part 15u of cylinder 15 communicates directly with the atmosphere instead of with a condensor chamber. Transparent chamber 25 is replaced by container 301. The container 301 is adapted to receive and to burn conventional fuel 302 to heat evaporator chamber 12. The evaporating liquid inside container 12 consists of water 303 instead of the low boiling point liquid 13. Water 303 will be naturally agitated during the vigorous heating and the boiling of the water and agitator rod 23 and blades 24 have been omitted.

The operation of the engine as described in FIG. 2 is as follows. Before the engine starts, the piston 16 is at its lowest position, and rests upon cylinder wall extension 15e. Valve 18 is open and valve 20 is closed. Fuel 302 burns in container 301 and heats evaporator container 12. This results in an increase of the temperature and vapor pressure inside chamber 12, and induces a pressure differential between the inside of chamber 12 and the outside atmosphere i.e. the vapor pressure in the evaporator chamber 12 becomes larger than the atmospheric pressure outside of chamber 12. When valve 18 is open the upper portion 15u of cylinder 15 communicates with the atmosphere outside of chamber 12. The pressure upon top wall 16a of piston 16 will therefore be equal to the relatively low pressure of the air outside of the chamber 12. In contrast, the lower portion 151 of cylinder 15 communicates with the vapor in the evaporator chamber 12. This will cause the vapor pressure upon bottom piston wall 16c to be equal to the relatively high vapor pressure in the evaporator chamber 12. When the pressure differential between the top and bottom walls of piston 16 exceeds the weight of the piston 16 and the resistance of spring 22 the piston 16 will rise in cylinder 15. As piston 16 moves upward and reaches its upper limit of travel, valve actuator 18a will close valve 18 and valve actuator 20a will open valve 20. The closing of valve 18 will stop the communication between upper portion 15u of cylinder 15 and the outside air while the opening of valve 19 will establish a communication between the upper portion 15u of cylinder 15 and the vapor portion 12v of evaporator chamber 12. This will cause the pressure upon the top wall 16a of piston 16 to be equal to the pressure upon the bottom wall 16c of the piston. The vapor pressure differential which has forced piston 16 upward against the force of gravity and the force of compression spring 22 will thus be eliminated and the weight of the piston 16 and spring 22 will force piston 16 to its initial low starting position. As piston 16 descends and reaches its lowest limit of travel valve actuator 20a closes valve 20, and valve actuator 18a opens valve 18. This closes the communication between upper space 16u with the vapor in chamber 12 and re-establishes the communication between the upper portion 15u with the outside air, to renew the cycle of operation. The water vapor which has accumulated in space 15u during the communication of the space 15u with the vapor chamber portion 12v, will expand into the air outside of chamber 12.

In a complete cycle of operation the up and down movement of the piston 16 will affect a corresponding movement of the force of transmission member 21. The movement is readily translated through appropriate linkages to useful work.

Figure 3:
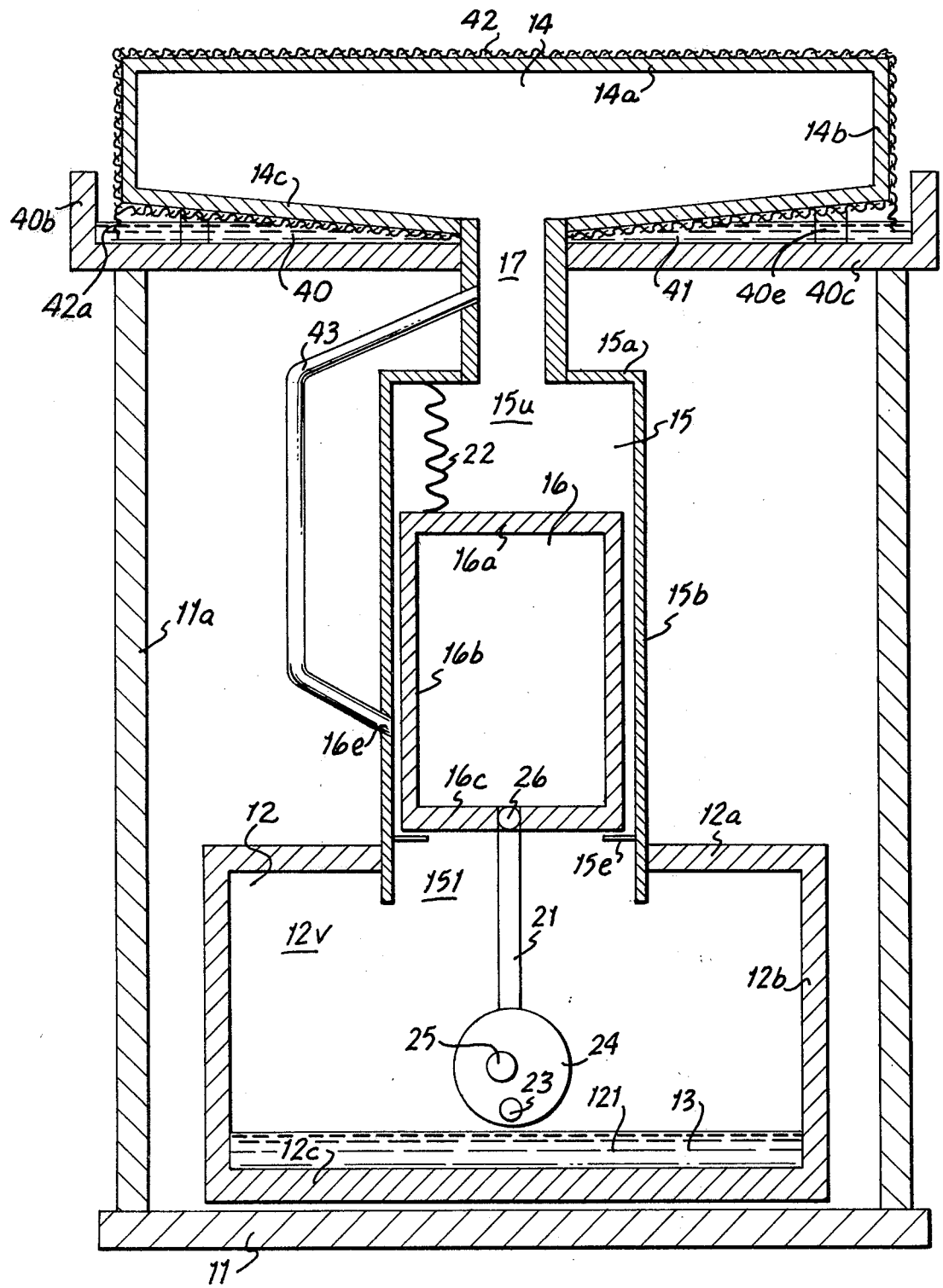
FIG. 3 is a diagrammatical sectional view of the engine in which the equalization of the pressures upon the opposing sides of the moving member is accomplished through a communication between the cold and warm chambers.

FIG. 3 represents another version of the instant return stroke differential temperature engine. Parts which are similar to those described in the previous figures have been given similar numbers. The engine is very simple in design and of relatively low construction cost.

As shown, a support 11 is provided for supporting an evaporator chamber 12. In the illustrated form of the invention the evaporator chamber 12 is defined as a rectangular chamber having top wall 12a, side walls 12b and bottom wall 12. Chamber 12 contains a liquid, preferably a low boiling point liquid 13, where the liquid defines a liquid chamber portion 121 and a vapor chamber portion 12v.

Suitably supported on a frame extension 11a is a tray 40. The tray is defined by side walls 40b and bottom wall 40c. Tray 40 is partially filled with water 41. Present inside the tray 40 is a condensor chamber 14. The condensor chamber 14 is defined by an upper wall 14a, side walls 14b, and bottom wall 14c. Bottom wall 14c are oblique to allow for the draining of fluid from condensor 14, as will be hereinafter described. The walls of chamber 14 are covered by wick material 42. The wick has extensions 42a which dip into water 41. The arrangement is such that condensor chamber 14 rests upon bottom wall extension 40e of container 40, and only lower part of condensor 14 is present inside tray 40. The level 41a of water 41 is below the lower wall 14c of condensor chamber 14, so that the only communication of condensor chamber 14 with water 41 is through wick extensions 42a. The water absorbed by wick extensions 42a spreads through capillary action and wets walls 14a, 14b, and 14c of container 14.

A cylinder 15 is present between evaporator chamber 12 and condensor member 14. The cylinder is defined by upper wall 15a and side walls 15b. The arrangement is such that the lower portion of cylinder 15 is present inside evaporator chamber 12, and communicates with the vapor portion 12v of evaporator chamber 12. The cylinder 15 penetrates chamber 12 through upper wall 12a of chamber 12. The cylinder 15 forms a tight fit with the upper wall 12a to prevent leakage of vapor from evaporator 12.

A piston 16 is present inside cylinder 15 and rests upon cylinder wall extension 15e. The piston is defined by upper wall 16a, side walls 16b, and bottom wall 16c. The side walls 16b of piston 16 are in very close proximity to the side walls 15b of cylinder 15. This prevents the passage of vapor between the cylinder and the piston, but allows the piston to move freely vertically within the cylinder. The piston 16 defines a top cylinder portion 15u, present above the piston, and a low cylinder portion 15e present below the piston.

Conduit 17 communicates between the upper cylinder portion 15u and condensor 14. Another conduit 43 communicates between conduit 17 and cylinder 15 through a hole 16e in cylinder side wall 15b. The arrangement is such that when piston 16 has reached its upper limit of travel in cylinder 15 it is present slightly above the hole 16e and allows a communication between the cylinder 15 and conduit 17. When the piston 16 is in its lower position it is present between hole 16e and lower cylinder portion 15e and obstructs the communication between cylinder 16 and conduit 17. Compression spring 22 is present between upper wall 16a of piston 16 and lower wall 15c of cylinder 15. Connected to the bottom wall of piston 16 is a force transmitting rod 21 which is connected through conventional linkages to work producing means. In the illustrated form of the invention the rod connects wrist pin 26 with crank pin 23. The reciprocal motion of the piston 16 and connecting rod 21 is transformed to circular motion of flywheel 24 and shaft 25.

The operation of the engine as illustrated in FIG. 3 is as follows. Before the engine starts the piston 16 is at its lowest position and rests upon cylinder wall extension 15e. Water 41 in tray 40 rises by capillary action through wick extension 42a and wick 42 and wets the walls of condensor chamber 14. The water evaporates naturally and cools condensor chamber 14 to below ambient temperature. In contrast, the temperature in evaporator chamber 12 is kept at ambient temperature by ambient air. This results in a temperature differential between evaporator chamber 12 and condensor chamber 14. The temperature differential causes a corresponding vapor pressure differential between the chambers, i.e. the vapor pressure in evaporator chamber 12 becomes larger than the vapor pressure in condensor chamber 14. When piston 16 is in its lower position opening 16e is closed and the vapor in evaporator chamber 12 is separated from the vapor in condensor chamber 14. The vapor pressure upon top wall 16a of piston 16 will be equal to the relatively low vapor pressure in condensor chamber 14. In contrast, the vapor pressure upon the bottom wall 16c of piston 16 will be equal to the relatively high vapor pressure in evaporator chamber 12. When the pressure differential between the top and bottom walls of piston 16 exceeds the weight of piston 16 and the resistance of spring 22 the piston 16 will move upwards in cylinder 15. As piston 16 moves upward and reaches its upward limit of travel, it exposes opening 16e. This establishes a communication between the vapor of the lower portion of cylinder 15 and the vapor in evaporator chamber 12. This will cause vapor to leave chamber 12 and enter condensor chamber 14 through conduit 43. This results in the equalization of pressure in the condensor and evaporator chamber 14 and 12. This will cause the pressure upon the top wall 16a of piston 16 to be equal to the pressure upon the bottom wall 16c of the piston. The vapor pressure differential which has forced piston 16 to move upward against the resistance of spring 22 will thus be eliminated. The rebound of spring 22, the weight of piston 16 and inertia of flywheel 24 will bring piston 16 to its initial low starting position. This will reestablish the separation between the vapors in the condensor and evaporator chambers 14 and 12, and will renew the cycle of operation. The relatively low temperature in condensor chamber 14 will cause the excess vapor in the chamber to condense into a liquid. The liquid will be directed by the oblique walls 14c into conduit 17 and upper space 15u of cylinder 15. When piston 16 rises it will cause most of the liquid to accumulate in conduit 17 and conduit 43. The liquid will return to evaporator chamber 12 from conduit 43 by the force of gravity when a communication between conduit 43 and the lower portion of the cylinder 16 is established during the normal course of operation.

In a complete cycle of operation the up and down movement of piston 16 will affect a corresponding movement of the force of transmission member 21. The movement is readily transmitted to crank 23 and shaft 25 for the production of useful work.

It is understood that communication between the warm and cold chambers to equalize the pressures upon the two opposing sides of a moving member may be achieved by a variety of means, such as different valve systems, without departing from the essence of the invention.

While the invention has been described with reference to the embodiments in FIGS. 1-3, it will be readily understood that modifications of the invention may be made without departing from the essence of the invention as described in the following claims.

What is claimed is:

1. An instant return stroke differential temperature engine consisting of a relatively cold and a relatively warm chambers, said chambers containing an evaporating liquid to obtain a vapor pressure differential between the cold and warm chambers, a moving member responding to said vapor pressure differential, a communication of one side of the moving member with the warm chamber, a communication of the opposing side of the moving member with the cold chamber to obtain a pressure differential upon the opposing sides of the moving member, means for establishing a communication of said opposing side of the moving member with the warm chamber to equalize the pressure upon the sides of the moving member and allow a return of the moving member to its initial position, and means for stopping the communication of said moving member with the cold chamber to prevent loss of thermal energy during said return of the moving member to its original position.

2. The invention as described in claim 1 and including means to overcome friction during the return stroke.

3. The invention as described in claim 1 and including means for agitation of the fluid in the warm chamber to obtain an even distribution of heat within the chamber.

4. An instant return stroke differential temperature engine consisting of a relatively cold and a relatively warm chamber, said chambers containing an evaporating liquid to obtain a vapor pressure differential between the cold and the warm chambers, a cylinder communicating between the cold and the warm chambers, a moving member in said cylinder responding to said vapor pressure differential, a passageway in the wall of said cylinder communicating between the cold and the warm chambers, said passageway controlled by the position of said moving member in said cylinder so that said passageway is closed and opened by the movement of said moving member.

* * * * *